United States Patent Office 2,807,648
Patented Sept. 24, 1957

2,807,648
PROCESS FOR MAKING SULFONIUM COMPOUNDS

Harold M. Pitt, Torrance, Calif., assignor to Stauffer Chemical Company, a corporation of Delaware No Drawing. Application September 16, 1955, Serial No. 534,869

7 Claims. (Cl. 260—607)

This invention relates to a method of making triaryl sulfonium salts. Such salts have heretofore been made by the use of aryl sulfides, but this method has given low yields and has thus resulted in an expensive product. The triaryl sulfonium salts have many interesting properties, particularly with respect to their ability to flocculate various finely divided materials, but the investigation of such salts has been handicapped due to the difficulty of preparing them and their resulting high cost.

It is therefore an object of the present invention to produce triaryl sulfonium salts by a novel method utilizing low cost raw materials and wherein a high yield is obtained.

Another object of this invention is to provide a process whereby either symmetric or asymmetric triaryl sulfonium salts can be made.

Other objects will be apparent from the balance of the application.

In general, the objects of the present invention are achieved by first mixing an excess of an aryl hydrocarbon, a substituted aryl hydrocarbon or mixtures thereof with aluminum chloride in a vessel which is equipped for the addition of sulfur monochloride and chlorine and which has provisions for cooling and for safely venting evolved gases. After the hydrocarbon and the anhydrous aluminum chloride are thoroughly mixed, sulfur monochloride is added at such a rate that the reaction temperature can be kept to a desired value. Approximately one-half mole of sulfur monochloride (or the equivalent amount of sulfur dichloride) is added for each mole of aluminum chloride which is present. Chlorine is then added, along with cooling, so that the temperature is maintained at the value previously chosen. Approximately three moles of chlorine are added per mole of sulfur monochloride. The reaction goes as follows:

$6RH + S_2Cl_2 + 2AlCl_3 + 3Cl_2 \rightarrow 2R_3SCl + AlCl_3 + 6HCl$

After the chlorine addition is complete, water is added in sufficient quantity to dissolve the aluminum chloride, which results in the breaking of the complex compound of aluminum chloride and the triaryl sulfonium compound. At this point, cooling must be applied since the reaction is exothermic.

Instead of sulfur monochloride, sulfur dichloride may be used.

The following non-limiting examples illustrate methods of carrying out the present invention.

Example 1.—Preparation of triphenyl sulfonium chloride.—About 1400 parts by weight of benzene and 430 parts of anhydrous aluminum chloride are placed in a vessel and agitated. After the addition has been made, 270 parts of sulfur monochloride are added, keeping the temperature between 13–14° C. by cooling the walls of the vessel. This addition is complete in 12–13 minutes. Chlorine is then sparged into the agitated mass for 55 minutes, at such a rate that 350 parts are added. The temperature is maintained constant at 13–14° C. At the end of this time, the reaction mixture is fed slowly into a second vessel containing approximately 1200 parts of water.

This vessel is equipped with an agitator and fitted with a reflux condenser. The rate of addition of the reaction mixture is so governed that the refluxing of the surplus benzene does not exceed the capacity of the condenser. When the addition is complete, the agitator is stopped and after a settling period, the strong aluminum chloride solution is drawn from the bottom of the vessel. Then, 500 parts of fresh wash water is introduced and after sufficient agitation and settling, 875 parts of crude triphenyl sulfonium chloride is drawn from the bottom of the vessel.

Example 2.—In the same manner as Example 1, 532 parts of anhydrous aluminum chloride and 1400 parts of benzene are agitated in the same vessel. 270 parts of sulfur monochloride and 425 parts of chlorine are added through the same sparger at the same time, care being taken that the rates of addition are such that both are added in the same length of time. The temperature is held at 11–15° C. and the addition is made over a period of one hour and 46 minutes. The product is worked up in the same manner as Example 1, yielding a crude solution containing the equivalent of 761 parts of anhydrous product.

Example 3.—Preparation of tri-p-chlorophenyl sulfonium chloride.—About 2,000 parts of chlorobenzene and 430 parts anhydrous aluminum chloride are agitated in the same vessel. To this, is added 270 parts of sulfur monochloride. The temperature is kept in the range from 30–35° C. Chlorine is then sparged into the agitated mass until 350 parts have been added. The product is then worked up in the same general way as Example 1, to produce 1525 parts of a solution of water in tri-p-chlorophenyl sulfonium chloride. This contained 1232 parts of the anhydrous material.

Example 4.—Preparation of tri(2,4,5 trichlorophenyl) sulfonium chloride.—About 300 cc. of 1,2,4 trichlorobenzene and 66⅔ g. anhydrous AlCl₃ are agitated with cooling in a 500 cc. flask; 20 cc. S₂Cl₂ is added slowly. Then 53¼ g. Cl₂ is added over a 20 minute period. The temperature rises to 50° C. by the end of the addition. External cooling is provided and HCl is evolved in both steps. As long as the temperature is kept at 50° C. or above, the mass remains fluid; below that, solidification begins to occur. The AlCl₃ complex is then decomposed with warm water. The product dissolved in excess trichlorobenzene is washed once with dilute HCl and once with hot water. The separated organic layer is allowed to cool and the sulfonium salt crystallizes. This is separated and washed with isopropyl alcohol to yield a white crystalline solid. To get the maximum yields, the mother liquors are worked. A total of 264 grams of the sulfonium salt is thus obtained.

Example 5.—Preparation of tri(biphenyl) sulfonium chloride.—About 115.5 grams of biphenyl was dissolved in 200 cc. of hexachlorobutadiene. Then 33 grams anhydrous AlCl₃ was added, followed by 10 cc. of sulfur monochloride, which was added with agitation and cooling. A quantity of 26¾ grams of Cl₂ was then added. The sulfonium compound complexed with the AlCl₃ and was not soluble in hexachlorobutadiene, so the excess solvent was removed and the complex taken up with CHCl₃ and decomposed in water. The solution was washed in water, separated and the solvent evaporated. The crude product weighed 101 grams and the infrared spectrum showed the product to be almost exclusively tri(biphenyl) sulfonium chloride.

Example 6.—Preparation of diphenyl chlorophenyl sulfonium chloride.—A 500 cc. flask was charged with 90 cc. of benzene, 200 cc. monochlorobenzene and 54 grams anhydrous AlCl₃; 20 cc. S₂Cl₂ was then added slowly with good agitation and cooling. Then 44 grams $Cl_2$ was added. The reaction product was decomposed in warm water. The sulfonium chloride separated from the monochlorobenzene and aqueous $AlCl_3$ solution and was dissolved in fresh water. The product yield was established by titration of the sulfonium salt with a standard sodium lauryl sulfate solution; it was 94 grams. The infrared spectrum showed it to be diphenyl parachlorophenyl sulfonium chloride.

*Example 7.—Preparation of dinaphthyl parachlorophenyl sulfonium chloride.*—In the same way, a 500 cc. flask was charged with 128 grams of naphthalene, 54 grams anhydrous $AlCl_3$, and 200 cc. of monochlorobenzene; 20 cc. of $S_2Cl_2$ was then added with cooling. Then 44 grams of $Cl_2$ was added and the complex was decomposed with hot water. The solution of the sulfonium chloride in monochlorobenzene was treated with acetone, precipitating the sulfonium salt. The yield of product was 150 grams. Identification was by infrared spectrum.

*Example 8.—Preparation of dinaphthyl phenyl sulfonium chloride.*—A 500 cc. flask was charged with 128 grams of naphthalene, 54 grams anhydrous $AlCl_3$ and 200 cc. of benzene, 20 cc. of $S_2Cl_2$ were added, followed by 44 grams of $Cl_2$. The complex was decomposed in hot water and washed. The product was separated from the solvent and weighed 143 grams. Identification was by infrared spectrum.

*Example 9.—Use of sulfur dichloride.*—Seven liters of benzene and 4½ pounds anhydrous aluminum chloride were agitated in a 12 liter flask. 16 gram moles of sulfur dichloride was added below the surface of the liquid, keeping the temperature between 13 and 17° C.; then 16 gram moles of chlorine was added with the same temperature limitations. The product was worked up as in Example 1, to yield a solution containing approximately 4000 g. of the anhydrous triphenyl sulfonium chloride.

With most compounds, the major portion of the aluminum chloride complex may be removed with a simple water wash. Some sulfonium compounds, e. g., triphenyl, the tendency to complex with positive ions is so great that the last traces of hydrated aluminum chloride are more difficult to remove. However, hydrated aluminum chloride complex may be broken down to yield the sulfonium chloride free of hydrated aluminum chloride, as the following example shows.

*Example 10.*—The reaction product from 1600 cc. of benzene, 430 grams $AlCl_3$, 160 cc. $S_2Cl_2$ and 350 grams of $Cl_2$ was added to 1200 cc. of water and 500 cc. 93% $H_2SO_4$. The aqueous phase separated and the organic layer was then washed with a solution of 180 cc. 93% $H_2SO_4$ in 820 cc. $H_2O$. The product separated and washed with a solution of 168 grams NaOH in 800 cc. $H_2O$. The sulfonium salt solution was separated from the sodium sulphate solution and by analysis contained 894 grams of anhydrous triphenyl sulfonium chloride. This water solution could be diluted to any concentration without the separation of an aluminum complex.

I claim:

1. The process of preparing triaryl sulfonium chlorides comprising reacting a hydrocarbon chosen from the group consisting of benzene, halogenated benzene, diphenyl, naphthalene and mixtures thereof with aluminum chloride, adding thereto a member chosen from the group consisting of sulfur monochloride and sulfur dichloride, and then adding chlorine thereto to produce a triaryl sulfonium chloride, aluminum trichloride complex.

2. The process of claim 1 where the hydrocarbon is in excess of the stoichiometric ratio and wherein the aluminum trichloride and chlorine are about in a stoichiometric ratio.

3. The process of making triphenyl sulfonium chloride comprising mixing benzene with aluminum chloride, adding a sulfur chloride thereto, and adding chlorine to the mixture thus produced.

4. The process of making chlorophenyl diphenyl sulfonium chloride comprising mixing monochlorobenzene and benzene with aluminum chloride, adding a sulfur chloride thereto and adding chlorine to the mixture thus produced.

5. The process of making tribiphenyl sulfonium chloride comprising mixing biphenyl with aluminum chloride, adding a sulfur chloride thereto and adding chlorine to the mixture thus produced.

6. The process of making phenyl dinaphthyl sulfonium chloride comprising mixing naphthalene and benzene with aluminum chloride, adding a sulfur chloride thereto and adding chlorine to the mixture thus produced.

7. The process of making tri-p-chlorophenyl sulfonium chloride comprising mixing monochlorobenzene with aluminum chloride, adding a sulfur chloride thereto and adding chlorine to the mixture thus produced.

References Cited in the file of this patent

UNITED STATES PATENTS 2,713,038      De Jong _____ July 12, 1955